United States Patent [19]

Abdelmouttalib et al.

[11] Patent Number: 5,184,348
[45] Date of Patent: Feb. 2, 1993

[54] ISND MULTIPROTOCOL COMMUNICATIONS CONTROLLER

[75] Inventors: Najib Abdelmouttalib, Conflans-Sainte-Honorine; Didier Duflot, Issy-Les-Moulineaux, both of France

[73] Assignee: Bull, S.A., France

[21] Appl. No.: 453,581

[22] Filed: Dec. 20, 1989

[30] Foreign Application Priority Data

Dec. 27, 1988 [FR] France ............................ 88 17208

[51] Int. Cl.$^5$ ............................................. H04J 3/12
[52] U.S. Cl. ............................. 370/95.1; 370/110.1; 370/85.7
[58] Field of Search .................... 370/95.1, 110.1, 85.7

[56] References Cited

U.S. PATENT DOCUMENTS

| | | | |
|---|---|---|---|
| 4,437,183 | 3/1984 | Profet | 370/95.1 |
| 4,745,600 | 5/1988 | Herman et al. | 370/95.1 |
| 4,888,766 | 12/1989 | Ogasawara | 370/95.1 |

FOREIGN PATENT DOCUMENTS

| | | |
|---|---|---|
| 0250075 | 4/1987 | European Pat. Off. |
| 0280171 | 2/1988 | European Pat. Off. |

OTHER PUBLICATIONS

Ichikawa et al., "High-Speed Packet Switching System for Multimedia Communications", IEEE 1987.
French et al., "An Eight Channel Synchronous Data Controller for a Primary Rate Interface to ISDN", IEEE 1987.
Kun, Randy, "A VLSI Approach to supporting LAPD in an ISDN exchange termination", IEEE 1986.

*Primary Examiner*—Douglas W. Olms
*Assistant Examiner*—Min Jung
*Attorney, Agent, or Firm*—Wolf, Greenfield & Sacks

[57] ABSTRACT

An ISDN multiprotocol communications controller for controlling a communication link of thte $S_2$ type ($LS_{21}$ to $LS_{24}$) between a computer (COMP) and a set of terminals ($T_1, T_2, \ldots$) through an automatic telephone branch exchange (PABX) comprising a basic controller (UEI) controlling the higher communication layers of the OSI model and a peripheral device (UPRI) executing the control of communications between the computer (COMP) and the other terminals, as well as the multiplexing and demultiplexing of the data channels of the link. The controller includes, in series, a dynamic allocation device (DADI) allocating the time channels ($VT_i, VT_j$) corresponding to the data channels, executing the concentration of m time channels of the link in n physical channels (with $m > n$) of a dual-access memory (DAMI) of the FIFO type, in transmission and reception, and a signal processor (PCSI) connected to a programmable memory ($MMI_2$) containing programs for processing the multiplicity of protocols contained in the $S_2$ link. The invention is useful in the control of communications in an ISDN network.

29 Claims, 6 Drawing Sheets

ISND MULTIPROTOCOL COMMUNICATIONS CONTROLLER

BACKGROUND OF THE INVENTION

1. Field of the Invention

The present invention concerns an ISDN (Integrated Services Digital Network) multiprotocol communications controller. The communications controller is used in particular in data transmission network terminal equipments where data are routed through a type $S_2$ communication link defined by European standard ECMA 104 (European Computer Manufacturers Association), each terminal being connected through this link to a digital automatic telephone branch exchange.

2. Discussion of the Prior Art

It is known that a wide area data service is made up of a multiplicity of devices generally called "Data Terminal Equipment," (DTE) which are also commonly called terminals or stations or language facility stations. These terminals can be formed from computers, or any type of telephone set. These data terminals communicate with one another via a transmission system or transmission line made up, for example, of two pairs of telephone wires (one for transmission and the other for reception) or, alternatively, a coaxial cable. The transmission line physically connects the geographical locations where the terminals are located.

Local area networks are communications networks restricted to premises limited in area (business premises, industrial plant, campus, hospital) where the distances between the various terminals are on the order of a few meters or scores of meters to a few kilometers.

The various stations or terminals of a network transmit data messages and receive messages transmitted by the other stations. An individual message is called a data frame. The data frame is structured and includes information such as a start of frame delimiter, an end of frame delimiter, the address of the terminal to which the message is addressed, the address of the source terminal, the length of the data, and the useful data. In other words, the data frame is the elementary block of data transmitted by any terminal transmitting over the transmission line.

The rules of access to the various terminals that control the dialogue between these terminals define what is commonly called a protocol. A protocol constitutes a system that schedules communication between the terminals without hierarchical layering of the communication.

Various types of protocols are known. One of the most widely used protocols is the HDLC protocol ("High Level Data Link Control"), standardized according to CCITT (Consultative Committee in International Telegraphy and Telephony) Recommendation X25, Yellow Book, Section XIII. Nov. 2, 1980, and according to the international standards defined by the International Organization for Standardization, called ISO, under the following designations: IS3309-2, IS4335, IS6159 and 6256.

There also exists a protocol defined by the European standard ECMA 102 (and also by CCITT under the designation V110), that tends to be used more and more of late.

A terminal comprises two essential functional parts—namely, the data source or receiver, and, the communications controller that forms the link between the circuits which carry out the terminal's communication functions and the other terminals. The circuits which perform the terminal's communication functions implement, in particular, protection against data transmission errors and introduces special data called housekeeping data that make it possible to guarantee the communication between the various terminals. The communications controller may, or may not, constitute a subsystem physically dissociable from the terminal's data processing units. Generally, between the communications controller and the transmission medium there is also included data circuit terminating equipment (DCE), which is a device charged, in particular, with ensuring compatibility between the transmission media and the electrical signal delivered by the terminal. This function is implemented in current practice by the modulation demodulation of an auxiliary carrier signal in a device called a "MODEM."

The entire data exchanged between the various terminals are usually in the form of a set of coded binary data (bits).

Generally speaking, the data transmitted by the data source are in the form of sets of eight bits, called bytes, which are parallel transmitted. On the other hand, data bits within bytes are serial-transmitted by the transmission line. Therefore, the controller transforms parallel data bytes into serial data bytes. The controller also has multiplexing functions, that is to say, it can simultaneously serial transmit several different communications over the same transmission line.

The trend of the technological development of networks and the rapid development of the use of minicomputers has led to the us of programmed communications controllers called front end processors.

A front end processor is implemented using a microprocessor connected to one or more memories. The function of the front end processor in the system is to reduce the load on the central processing unit of the computer by carrying out a part of the handling of the messages transmitted by the various terminals belonging to this system.

The front end processor is distinguished by the following:

System software much more simple than that of the central processing unit, containing dedicated modules that make it possible to control the transmission line interlinking the terminals of the computer and the network's line and having facilities for forming message queues (in main memory or auxiliary memory).

In addition, this software has to provide for the simultaneous execution of a great number of processes:

The input and output functions are implemented in order to rapidly control numerous interrupts, which implementation implies very efficient facilities for switching the microprocessor's environment, as well as multiple interrupt levels.

In other words, the front end processor implements telecommunications network control functions, that is to say, control of the network's lines and terminals, and provides for the temporary storage of messages in the front-end processor memory. The mode of connection of the front end processor to the central processor and the allocation of the workload between them varies according to the manufacturer. For instance, in the computer bearing the trade name the DPX 2000 from the BULL, S.A., company, the communications controller consists of a basic controller that receives data coming from the computer's central processor or from the various terminals dependent on this computer and controls the higher communications layers (primarily, layers 3 to 7) of the OSI (Open System Interconnection) - reference model defined by the ISO (data storage, resource and data sharing, access control, queuing, fall back, recovery, etc.), and of a peripheral device disposed between the basic controller and the data circuit terminating equipment (DCE), which is connected to the transmission line. The peripheral device carries out the control of communications between the basic controller and the other terminals of the network (other than those directly connected to the computer), as well as the time division multiplexing and demultiplexing of the various data channels of the link between the terminal and the automatic branch exchange (layer 2 of the ISO model). It will be noted that an automatic digital telephone branch exchange of the private type is also called a PABX.

One current technological development trend in the field of data transmission network is the concentration of telephone traffic and data communications and, more generally, all digital traffic, upon a common infrastructure. This is due primarily to the gradual introduction of digital techniques in the telephone network for switching and transmission between switches on the one hand and for the servicing and connection of subscribers on the other. This is the aim of the Integrated Services Digital Network (ISDN).

The Integrated Services Digital Network makes it possible to offer the following in addition t digital telephony:

A greater variety of data communication applications, in particular, those that necessitate the transfer of files in a short time.

The multiplexing, on the same subscriber line, of different low-speed channels carrying several concurrent data communication streams, or, alternatively, remote warning, telemetering or remote control signals.

The transmission of fixed images with enhanced quality and speed, for example, high speed telefax.

The prospect of transmission in the near future (from now to 1995) of moving pictures (television, video telephone, video conferencing, etc.).

The ISDN is intended to be used mainly in Europe and in France in particular. Due to this application, the ISDN includes a certain number of interfaces standardized according to ECMA standards. For data communication between computers and PABXs, the most interesting interface is the interface called the $S_2$, defined by European standard ECMA 104. The $S_2$ interface is also called a type $S_2$ communication link. Accordingly, this link uses a telephone transmission line as the physical transmission medium.

A type $S_2$ link has a speed of 2048 megabits per second (Mb/s) and includes 32 discrete channels, namely 30 channels called type B channels for data communication at a speed of 64 kilobits per second (kb/s), one channel called a type D channel for signaling at 64 kb/s, and one frame alignment channel whose speed is also 64 kb/s. The principle of the $S_2$ link is time division multiplexing, each time channel constituting a discrete communication channel. The time division multiplexing of the various channels means that between two successive samples of the same channel there are 125 microseconds available to transmit 8-bit (1 byte) words which constitute the coded values of the samples. Accordingly, multiplexing consists in assigning within a 125-microsecond time interval a 3.9 microsecond time interval for each sample of one channel. The various interleaved samples are transmitted serially, the same i-th channel presenting itself every 125 microseconds. For instance, a set of 32 bytes having a duration of 125 microseconds is formed, which will be designated by the name "time frame" (not to be confused with the data frame defined above). In practice, the utilization of time multiplexing necessitates the presence of a lockword transported by the frame alignment channel that allows the receiver to register the start of-frame and accordingly align the different channels.

In other words, the entire time frame is made up of 32 8-bit time slots (ITs) labeled from 0 to 31, or time slots $IT_0$ to $IT_{31}$. Time slot $IT_0$ indicates the beginning of the time frame and time slot $IT_{16}$ carries the signaling for the set of data channels. This signaling channel, channel D, (to which time slot $IT_{16}$ corresponds) makes it possible to know the identity and nature of each party (that is to say, of each terminal or each computer), as well as the type of protocol on each of the other channels, and the total load necessary for processing the particular set of the link (because all channels are not necessarily used at the same moment).

Accordingly, it is thus seen that each data channel, during each time slot, transports 8 bits every 125 microseconds, that is to say, $8 \times 8000 = 64$ kb/s. The overall line rate is therefore equal to the sum of all the rates of the 32 channels, or $64 \times 32 = 2048$ kb/s.

Each channel is designed to carry communications using any type of communication protocol whatever and any type of data coding whatever. The most frequently used protocols are the HDLC protocol or the ECMA 102 protocol. This means that serial data coming from different terminals, for example, can be transmitted with different communication protocols over the same data channel. This means that the protocols can be different from one channel to another, and that the protocols used in the same channel over the course of time can also be different.

According to the requirements necessary in the exchange of messages between terminals connected by a type $S_2$ link, it can be necessary for the communications controller of a computer to control one $S_2$ link in its system, or, on the contrary, to control several type $S_2$ links in which just a particular number of data channels are being used. Accordingly, the communications controller must have as a main property great versatility and high speed.

The ECMA 104 standard being a recent one, communications controllers controlling a type $S_2$ link are rare.

Current solutions lie in the use of dedicated components, that is to say, dedicated communications controllers, each controlling a finite number of channels according to a given particular protocol. An example of a dedicated communications controller may be found in the controller made by the SIEMENS firm, whose trade name is the ITA and which controls a single ECMA 102 channel. Moreover, the physical interface between the transmission line and the communications controller is integrated within the ITA controller itself. Consequently, the use of dedicated components for controlling a specific protocol implies the dedication of controllers, and it is necessary to have as many controllers as protocols to control, which is rather awkward and expensive.

Moreover, there is no dedicated component for protocols that are specific to a given manufacturer or for protocols which have only been recently standardized.

In the present state of the state of the art, in order to make a communications controller that is able to control one or more type $S_2$ links, it is accordingly necessary to put together a set of dedicated components, each of which is tailored to the handling of a specific protocol. This is not very practical and is cumbersome and expensive.

SUMMARY OF THE INVENTION

The present invention makes it possible to cope with these difficulties by constituting a very fast communications controller, utilizing a signal processor (it is recalled that signal processors are processors the customary use of which consists in the performance of mathematical operations on digital data: multiplication, addition, integration, Fourier transforms, etc.) and a dynamic allocation device working under the control of the basic controller as defined hereinabove, making it possible to assign, at a specific instant, a data channel utilizing a given protocol to a specific physical transmission channel, with the communications controller including n different physical channels. The dynamic allocation device makes it possible, according to the requirements for telecommunications transmission at a specific instant, to assign to the physical channel to which a data channel having a first particular protocol corresponds, another data channel using a second protocol, or, alternatively, to assign the channel using the first particular protocol to another physical channel This defines the dynamic allocation of communication protocols used on different data channels to specific physical channels. Accordingly, dynamic allocation causes the protocol to be changed in the same physical channel (this change being transparent to the other channels), or channels to be changed for the same protocol, all without resetting the other channels.

Accordingly, the communications controller according to the invention is able to control one or several type $S_2$ links simultaneously, while saving space and being inexpensive.

According to the invention, the ISDN multiprotocol communications controller, providing for the control of at least one type $S_2$ communication link supported physically by a transmission line, and comprising a specific number of data channels controlled according to a multiplicity of protocols, between a computer and a set of terminals interlinked via a telephone automatic branch exchange, includes:

a basic controller that receives the data coming from the computer or from the terminals via the communication link, and controls the higher communications layers of the OSI model, and a peripheral device disposed between the basic controller and data circuit terminating equipment (DCE), the DCE connected to the transmission line and matching the transmission media with the electrical signals coming from the basic controller via the peripheral device, the peripheral device carrying out the control of communications between the computer and the other terminals, as well as carrying out the time division multiplexing and demultiplexing of the various data channels of the link. The peripheral device includes, disposed in series between the DCE and the basic controller, a dynamic allocation device, a dual-access random access memory comprising n discrete physical channels of a FIFO (first in/first out) type, both for transmission and for reception, and a signal processor linked to a programmable memory. The allocation device receives the data and a timing signal sent by the DCE over a serial data bus carrying m time channels with m equal to or greater than n , and transforms the sets of serial bits into a set of parallel bits sent to the dual access memory, ensuring the concentration of m time channels in the n physical channels of the dual access memory by the dynamic allocation of m time channels to the n physical channels under the control of the basic controller. The processor reads (or writes) into each channel of the dual access memory the data that have been written (or read) in it by the allocation device, stores the data temporarily in memory, analyzes the status of the data frames according to the type of protocol used to transmit them, and extracts the data from the data frames in order to transfer them then to the basic controller.

Other features and advantages of the present invention will become evident in the following description which is given as a non-restrictive example and with reference to the attached drawings.

BRIEF DESCRIPTION OF THE DRAWINGS

In these drawings.

DETAILED DESCRIPTION

Figure 1:
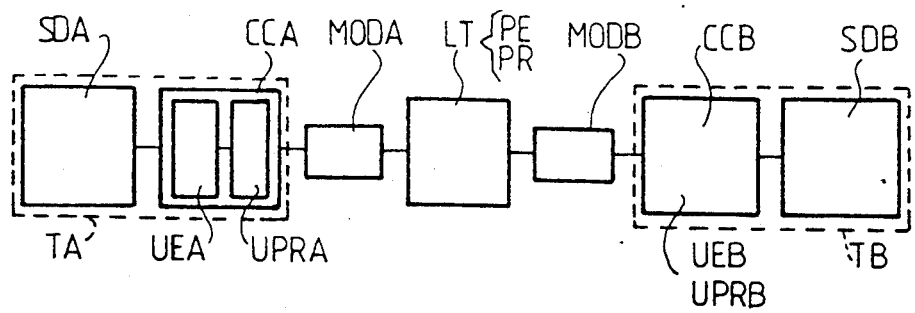
FIG. 1 recalls how data are transmitted from a first terminal to a second terminal.

Reference is made to FIG. 1, which shows schematically how data are transmitted from a first terminal, TA, to a second terminal, TB. Terminal TA comprises data source SDA and communications controller CCA, whereas the second terminal, TB, comprises data source SDB and communications controller CCB.

A first piece of data circuit terminating equipment (DCE) namely MODA, is connected between communications controller CCA and the transmission line, LT. Likewise, a second piece of data circuit terminating equipment, MODB, is connected between communications controller CCB and the transmission line, LT. This transmission line can be made up of two pairs of telephone wires, one pair for transmission, PE, and one pair for reception, PR.

Communications controller CCA comprises a basic controller, UEA, and a peripheral device, UPRA; likewise, controller CCB comprises a basic controller, UEB, and a peripheral device, UPRB. The purpose, composition, and functioning of the various components cited hereinabove has been detailed above. In particular, the data are parallel transmitted by the data source, STA, to communications controller CCA, which serial-transmits them to component MODA, which matches the electrical signal to the transmission line, LT. Controller CCA monitors and controls the transmission of communications between terminal TA and terminal TB. Communications controller CCB performs the same function for communications between terminal TB and terminal TA.

Figure 2A:
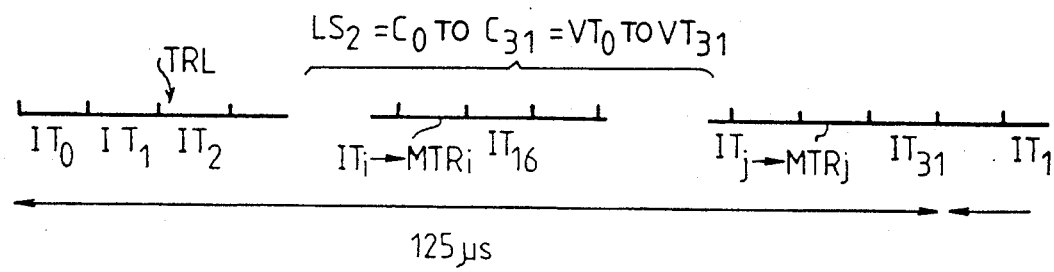
FIG. 2A and 2B recalls how a type $S_2$ communication link is implemented.
Figure 2B:
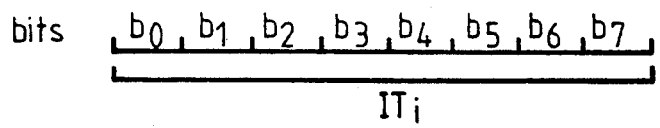

Reference is now made to FIG. 2, which shows how an $LS_2$ communication link, of the $S_2$ type defined by European standard ECMA 104, is constituted. The $LS_2$ link is made up of 32 channels, $C_0$ to $C_{31}$. These 32 channels constitute a set of discrete time channels, $VT_0$ to $VT_{31}$. The speed of the data transmitted over each channel or time channel is 64 kb/s, the set of the $LS_2$ communication link having a speed of 2048 Mb/s. Accordingly, in one second, it is possible to carry 8000 elementary time frames, TRL, each time frame comprising 32 bytes, each transmitted during time slots $IT_0$, $IT_1, \ldots, IT_{31}$. Each time slot, $IT_i$, makes it possible to route 8 bits, $b_0$ to $b_7$. The duration of an elementary time frame, TRL, is 125 microseconds, and the duration of a time slot, $IT_i$, is on the order of 3.9 microseconds. Time slot $IT_0$ makes it possible to mark the start of each elementary frame, TRL, whereas time slot $IT_{16}$ transports signaling information making it possible to know the identity and the nature of each party transmitting through a terminal and to deduce from it the type of protocol for each time channel, or channel, and the total processing load needed for the operation of the $LS_2$ link.

It is known that each terminal, such as TA or TB, transmits individual data messages, also called data frames, which can be designated by MTR, for example. One such frame, MTR, is transmitted according to a specific type of protocol—HDLC, for example—over one of the time channels $VT_0$ to $VT_{31}$—time channel $VT_i$, for example. Accordingly, frame $MTR_i$ is transmitted in the form of a series of bytes over time channel $VT_i$ within each time slot $IT_i$, and this occurs every 125 microseconds. The same would hold true for another frame or individual message, $MTR_j$, transmitted by another terminal over time channel $VT_j$ in the form of a series of bytes transmitted during time slot $IT_j$, according to a different protocol, such as the ECMA 102 protocol. One characteristic of the $LS_2$ data link defined by European standard ECMA 104 is the fact that it is able to circulate serially through the same time channel data frames or individual messages according to different protocols. It is seen that a type $S_2$ link offers considerable versatility.

The role of the CCA or CCB communications controller to receive the set of bytes relating to the same frame, $MTR_i$, and to reconstruct the set of this frame in order for it to be able to be read, understood and interpreted by one of the data sources, SDA or SDB. Furthermore, it can be concluded from the foregoing that it is not a question of confusing a data frame or individual message, $MTR_i$, transmitted by any terminal and having a duration that varies in accordance with the message transmitted, and an elementary time frame of the TRL type, which always has the same duration, namely 125 microseconds, and comprises 32 bytes, each of these belonging to a different data frame, $MTR_i$ or $MTR_j$.

Figure 3:
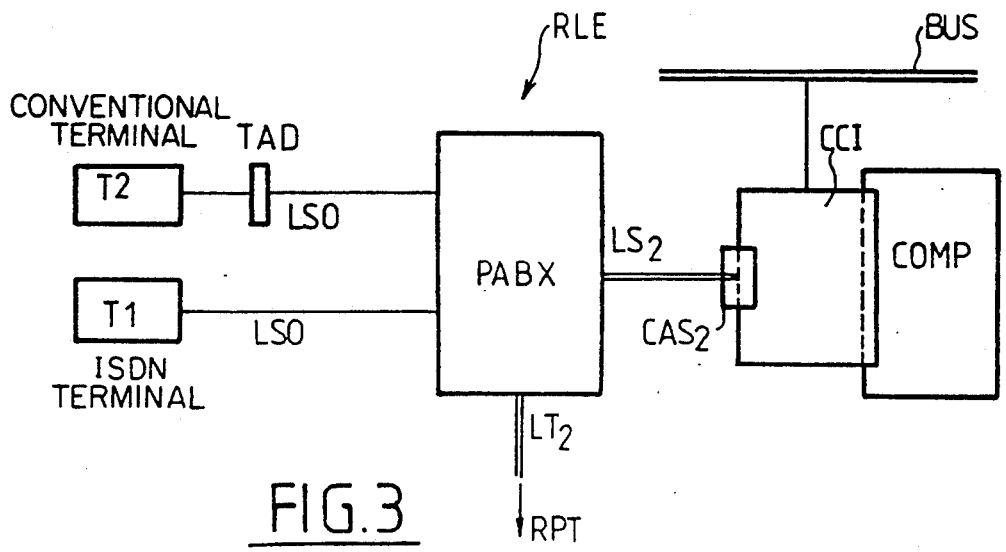
FIG. 3 shows a local area network comprising a plurality of terminals and computers interlinked by at least one type $S_2$ link to other terminals via an automatic telephone branch exchange, or PABX.

Reference is made to FIG. 3, which shows a local area network, RLE, of the ISDN type. Such a network comprises several terminals called conventional terminals, only one of which, namely terminal $T_2$, is represented in FIG. 3 and which transmits data at a speed that can be on the order of 1200, 9600 or 19,200 bits per second, and a plurality of terminals of the ISDN type, only one of which is represented, namely $T_1$. Each of these terminals, $T_1$ or $T_2$, is linked by a communication link $LS_0$, of the $S_0$ type, defined by CCITT Recommendation 1430, supported physically by a telephone transmission line (of the type of the line, LT, in FIG. 1), to a private automatic branch exchange (PABX). The $LS_0$ link has a speed of 64 kb/s. Due to the speed of the $LS_0$ link, between conventional terminal $T_2$ and the $LS_0$ link which is connected to it and which interlinks it with the PABX, a terminal adapter, TAD, is disposed. Terminal adapter TAD makes it possible to match the speed of the data transmitted by $T_2$ to the speed of 64 kb/s required by European standard ECMA 104 for each data channel.

The local area network, RLE, also comprises at least one computer such as computer COMP, connected to a communications controller, such as the communications controller according to the invention, CCI. This is linked to communication link $LS_2$ via a data circuit terminating device, $CAS_2$, also called an adapter or, alternatively, an $S_2$ card. The link, $LS_2$, makes it possible to link the adapter, $CAS_2$, and, consequently, the communications controller, CCI, to the automatic branch exchange, PABX. The automatic branch exchange, PABX, can be linked by a link, $LT_2$, to a public telephone network, RPT. By virtue of the telephone link, the computer, COMP, can be linked to any geographically remote terminal via link $LS_2$, the PABX and the public network, RPT. The PABX plays the role of a line concentrator.

Figure 4:
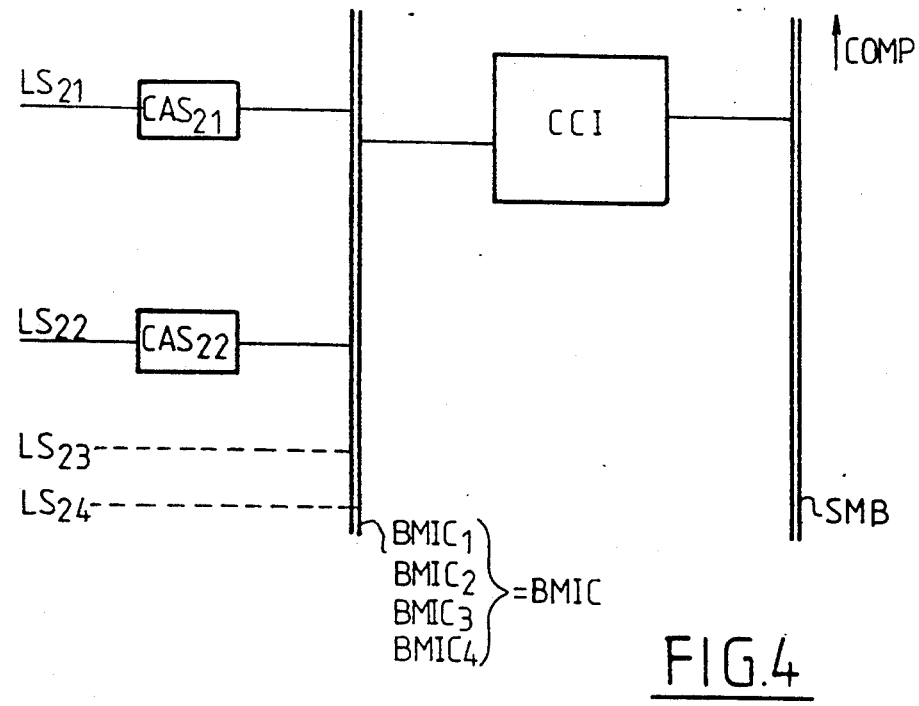
FIG. 4 shows how a communications controller according to the invention is connected to several type $S_2$ links and to the communication link bus of the computer to which it is connected.

Reference is made to FIG. 4, which shows a controller according to the invention, CCI, connected between a data bus, SMB, linking the central processing unit and the various terminals of a computer, COMP—which may be, for example, a computer of the DPX 2000 type from the BULL, S.A., company—and a bus BMIC and several type $S_2$ links, namely $LS_{21}$, $LS_{22}$, $LS_{23}$ and $LS_{24}$ connected thereto. An adapter, namely $CAS_{21}$ to $CAS_{24}$, ties in with each of these links respectively. A bus, namely $BMIC_1$ to $BMIC_4$, ties in with each link and with each adapter respectively. The BMIC bus is accordingly formed by the linking of four buses—$BMIC_1$ to $BMIC_4$. The time frames are transmitted synchronously through each bus, $BMIC_1$ to $BMIC_4$. Data are serial transmitted through each of these respective buses, whereas the SMB bus is a bus of the parallel type. The latter is, for example, of the type described in CNET's (Centre National d'Etudes de Telecommunications (National Center for Telecommunications Research), Paris) technical instructions relating to the SM 90 computer (corresponding to BULL's QUESTAR 700-DPX 2000) under the reference ST/PAA/OGE/SML/1/SM90 published by BULL SEMS. This SMB bus is a 32-bit parallel bus.

Each communication link, $LS_{21}$ to $LS_{24}$ allows 32 time channels. The communications controller, in the example of embodiment that will be described hereinunder, is capable of handling 128 time channels, each being able to transport over the course of time data frames, MTR, according to several different specific protocols.

Figure 5:
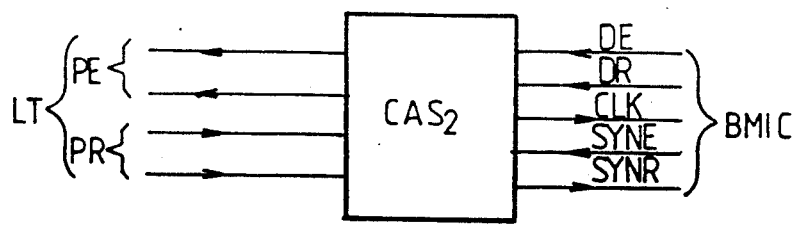
FIG. 5 shows how an $S_2$ link to serial data bus adapter functions, which adapter is connected to the communications controller according to the invention.
Figure 6A:
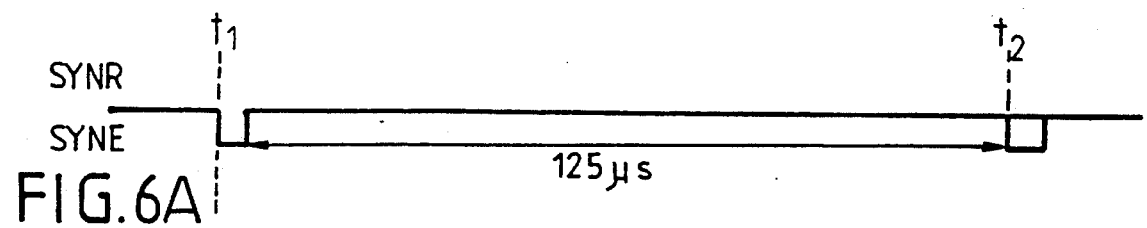
FIG. 6A–6C show various signals transmitted by the link adapter in FIG. 5 to the data bus in FIG. 5.
Figure 6B:
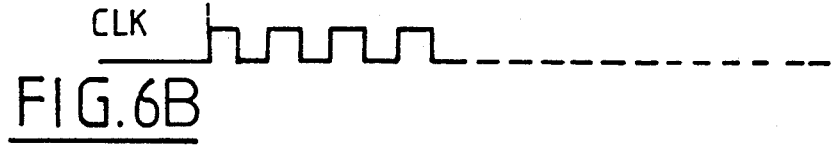
Figure 6C:
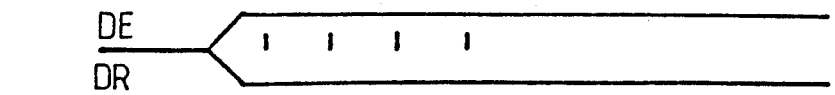

Reference is made to FIG. 5, which illustrates the role of an adapter, $CAS_2$. Adapter $CAS_2$ is connected to the transmission line, LT, and consequently to each pair of telephone wires, PE and PR, which physically support a communication link of type $LS_2$ illustrated in FIG. 2.

Data are transmitted over each time channel according to specific protocols, the data transported by each of these channels also being coded in a known manner. On the other hand, the communications controller, CCI, according to the invention, functions, in a particular preferred embodiment of the invention, in NRZ (Non Return to-Zero) code. Therefore, the $S_2$ adapter $CAS_2$ has the role of transforming the data transmitted by the $S_2$ communication link according to known and specific codes into data compatible with the communications controller, CCI, that is, coded in NRZ code. The $S_2$ adapter accordingly carries out the transcoding of data. Incidentally, adapter $CAS_2$ regenerates in each time channel a clock signal, CLK, used both for transmission and reception; in reception adapter $CAS_2$ transmits the data, DR, to the controller, CCI; and receives for transmission the data, DE, coming from the controller in NRZ code. It extracts from each time frame, TRL, a reception timing signal, SYNR, made up of a sequence of pulses transmitted at successive instants—$t_1$, $t_2$, etc.—separated from one another by a 125-microsecond time interval, or the duration of an elementary time frame, TRL. The transmission timing signal, SYNE, is synchronous with the SYNR signal.

The clock signal, CLK, is a periodic square signal having a frequency of about 2048 MHz.

The data, DR and DE, are such that each bit is validated at each leading edge of each CLK signal.

The data, DR and DE, that are transmitted by buses $BMIC_1$ to $BMIC_4$ are such that the time frames, TRL, allow 31 useful channels. Channel $IT_0$ (used for aligning the TRL frames over each of links $LS_{21}$ to $LS_{24}$) is used to carry, in the transmission mode, specific control signals coming from the controller, CCI, in order to drive each of cards $CAS_{21}$ to $CAS_{24}$. In the reception mode, signals indicating failures of transmission or failures of the links $LS_{21}$ to $LS_{24}$ are carried on channel $IT_0$.

Adapter $CAS_2$ has a role entirely analogous to that of conventional data circuit terminating equipment such as the MODA or MODB component shown in FIG. 1. The transcoding techniques necessary to change codes carried by each channel of the $LS_2$ link (such as the HDB3 code for the entire link specified by ECMA 104) to NRZ code, as well as the methods of extracting timing signals and clock signals are known in the art.

Figure 7:
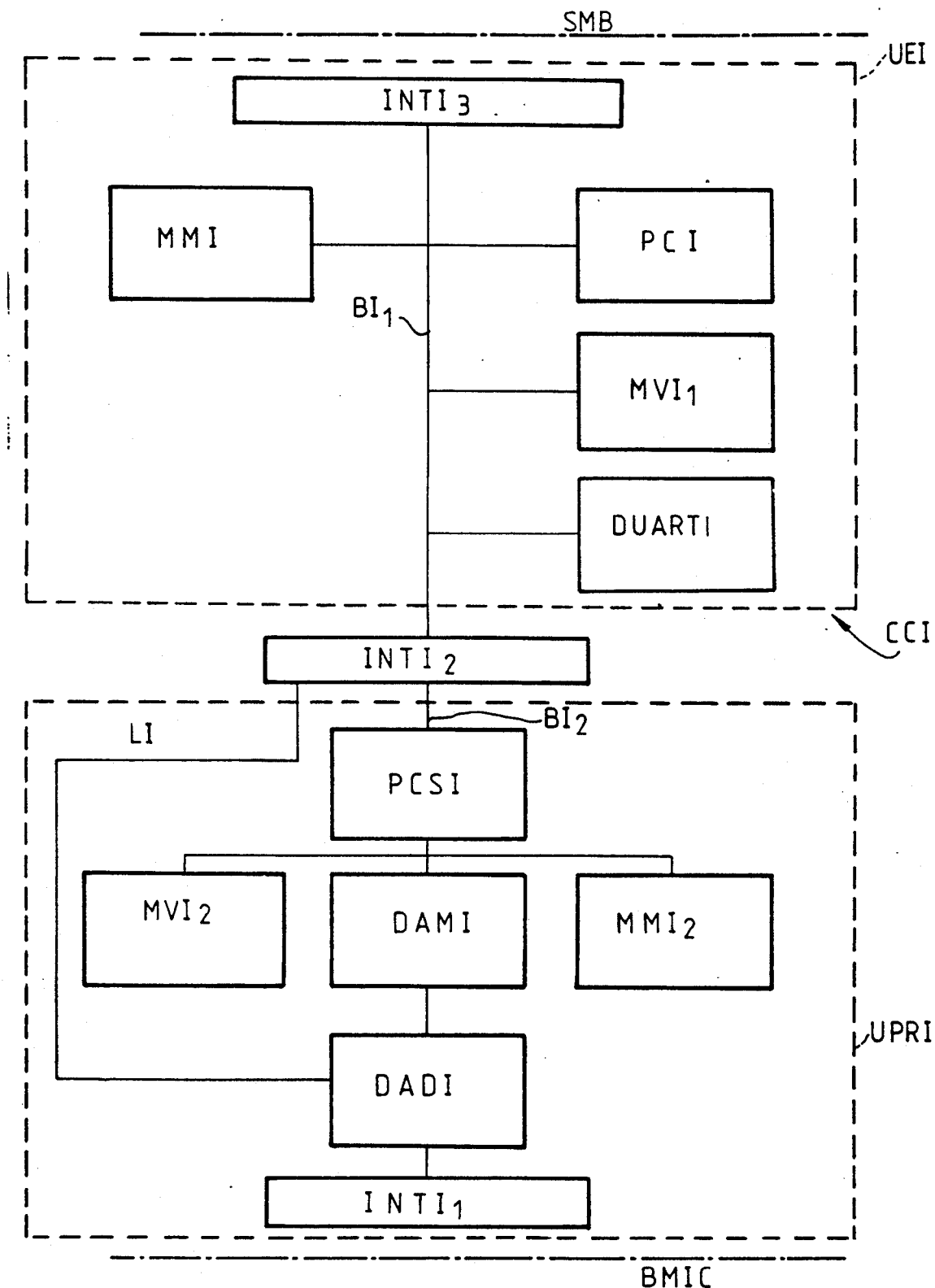
FIG. 7 shows the essential distinctive elements of the communications controller according to the invention.

Reference is now made to FIG. 7, which shows the essential components of the communications controller CCI, according to the invention.

This controller, CCI, comprises the following:
—a controller, UEI, which we will call a basic controller for the sake of simplicity,
—a peripheral device, UPRI,
—an interface, $INTI_2$, between the basic controller, UEI, and the peripheral device, UPRI.

The basic controller, UEI, is linked by 32 bit parallel bus SMB, as shown in FIG. 4, to the various terminals and to the central processing unit of the computer, COMP, which computer may be a computer of the DPX 2000 type made by the BULL, S.A. Company. The peripheral device UPRI is linked to bus BMIC shown as in FIG. 4.

As stated above, the basic controller, UEI, handles the higher telecommunications layers 3 to 7 of the OSI model after receiving the data coming from the central processing unit and various terminals of the computer, COMP, or the data coming from communication links $LS_{21}$ to $LS_{24}$ via the peripheral device, UPRI, and the interface, $INTI_2$.

The peripheral device, UPRI, handles the lower telecommunications layers (actually, layer 2) of the OSI model. It receives the various time frames, TRL, (see FIG. 2) and extracts the data from them, time channel by time channel, and concentrates the data transmitted over each respective time frame in order to reconstruct the whole or part of data frames $MTR_i$ or $MTR_j$ (see the description of FIG. 2). The peripheral device verifies that these frames—$MTR_i$ and $MTR_j$, etc.—are correct and sends these data via interface $INTI_2$ to the basic controller, UEI. The peripheral device, UPRI, then reports the status of data frames $MTR_i$ to $MTR_j$, etc., to the basic controller, UEI, and indicates to it whether or not these frames contain errors. Depending on whether or not there are errors in the time frames, the basic controller either requests or does not request the retransmission of frame $MTR_i$ (or $MTR_j$) from the terminal which transmitted it previously, according to whether or not this frame contained an error. The peripheral part, UPRI, analyses and verifies the status of the frames but does not decide the use that is to be made of them. This is within the scope of the basic controller, UEI. In the opposite direction, in the transmission of an $MTR_i$ frame, the peripheral device, UPRI, receives this frame sent by the basic controller, UEI, via the interface, $INTI_2$, and adds to it new bits of data so that frame $MTR_i$ will conform to the protocol, (HDLC, for example), according to which the frame is transmitted. For example, in HDLC, the peripheral device inserts zeros after a series of five bits equal to one, calculates the cyclic redundancy check code, CRC, and adds a flag which will make it possible for the network's receiving terminal to understand that the $MTR_i$ frame has been transmitted by the UPRI according to a protocol of the HDLC type and to execute the appropriate processing.

The peripheral device receives the data parallel transmitted by the basic controller, UEI, and series transmits them over the BMIC bus. The peripheral device transmits each $MTR_i$ frame transmitted to it by the basic controller, UEI, in the form of a series of bytes serial-transmitted over any time channel, $VT_i$, (except $VT_0$; see above) carried by one of buses $BMIC_1$ to $BMIC_4$.

The basic controller, UEI, is an analog one in the example of the embodiment described here for the basic controller of the BULL, S.A., DPX 2000 computer. The basic controller is constructed using a 68020 processor made by the MOTOROLA SEMI CONDUCTORS company, for example, located at Colvilles Road, Kelvin Estate, East Kilbride, Glasgow, Scotland. The basic controller is accordingly described using the particular technical terms relating to the 68020 processor of this manufacturer. This processor, PCI, is connected to a 64K read-only memory, $MMI_1$, and a 512K random access memory, $MVI_1$. These various components, namely PCI, $MMI_1$ and $MVI_1$, are interlinked via the same internal bus—$BI_1$—a 32-bit parallel bus in the example of embodiment described here. The processor, PCI, is timed by a 16.6 MHz clock.

The random access memory, MVI$_1$, contains programs for processing the higher telecommunications layers of the OS model as well as the data coming from the central processing unit and the various terminals of the computer, COMP, via the SMB bus and INTI$_3$ interface before they are transmitted under control of the processor, PCI, to the peripheral device, UPRI. In the reverse direction, during reception, the random-access memory, MVI$_1$, receives and stores the data transmitted by the peripheral device, UPRI, via interface INTI$_2$, before transmitting the data, still under control of the processor, PCI, to bus SMB, which routes the data toward the central processing unit or the va ious terminals of the computer COMP.

The peripheral device, UPRI, comprises the following:

a signal processor, PCSI, connected via its own internal bus, BI$_2$, to a random access memory, MVI$_2$, and a read only memory, MMI$_2$, and to interface INTI$_2$, a dual access memory, DAMI, a dynamic allocation device, namely DADI, for allocating time channels to the physical channels of the dual access memory, and an interface, INTI$_1$, between device DADI and bus BMIC.

The peripheral device, UPRI, is structured around the signal processor, PCSI. The signal processor, in the example of embodiment described here, is a signal processor of the TMS 320C25 type of the TEXAS INSTRUMENTS company. This processor and its applications are described in TEXAS INSTRUMENTS' book "Digital Signal Processing Applications With the TMS 320 Family," as well as in the TMS 3200C25 User's Guide. The TMS 320C25 signal processor is timed by a 33.3 MHz clock, which corresponds to a memory access time of 120 ns. The programmable read-only memory MMI$_2$ has a capacity of 64K, whereas the random-access memory MVI$_2$ has a capacity of 32K. Access to the read only memory and random access memory, MMI$_2$ and MVI$_2$, respectively, is accomplished without latency (access time of 35 microseconds). The signal processor, PCSI, has a data bus width—of bus BI$_2$—of 16 bits. The INTI$_2$ interface accordingly is designed in a manner to match the data bus, BI$_2$, having a width of 16 bits, of the signal processor, PCSI, to the internal data bus, BI$_1$, of the processor, PCI, which has a width of 32 bits. For example, MMI$_2$ and MVI$_2$ are made by Advanced Micro Devices under reference sign AM 27S51A.

Read only memory MMI$_2$ contains programs for processing the communication protocols (HDLC, ECMA 102, etc.) of the various channels of links LS$_{21}$ to LS$_{24}$. These programs are written in the form of firmware.

Figure 10:
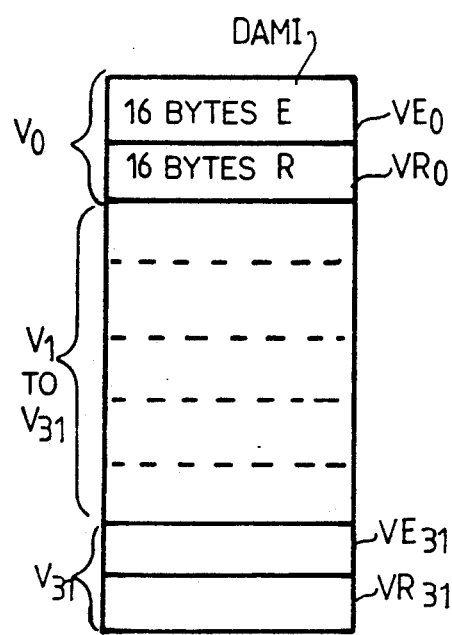
FIG. 10 shows how the dual-access memory of the peripheral device of the controller according to the invention is constituted.

The dual access memory, DAMI, is organized from 64 discrete elements of the FIFO (first in/first-out) type of 16 bytes each, each FIFO type element being assigned to a physical channel and a communication direction (transmission or reception). As can be seen in FIG. 10, which shows in a more detailed manner how the dual access memory, DAMI, is constructed, this memory contains 32 discrete physical channels, V$_0$ to V$_{32}$, each channel comprising one subchannel (corresponding to one 16-byte FIFO element), VE, set aside for transmission, and a second subchannel, VR, set aside for reception. Thus, physical channel V$_0$ is broken up into two subchannels VE$_0$ and VR$_0$, subchannel VE$_0$ associated with the transmission of data and VR$_0$ with the reception of data. It is the same for each of the other channels, V$_1$ to V$_{31}$. Thus, channel V$_{31}$ comprises two subchannels—VE$_{31}$ associated with transmission and VR$_{31}$ associated with reception.

The dynamic allocation device, DADI, is made up of, for example, an integrated component of the VLSI (very large scale integration) type having, for example, the reference sign DP3120 of NATIONAL SEMI CONDUCTORS. The dynamic allocation device, DADI, is controlled via a link, LI, by the processor, PCI, of the basic controller, UEI, via interface INTI$_2$.

The interface between the dynamic allocation device, DADI, and bus BMIC, namely INTI$_1$, reshapes the signals coming either from the dynamic allocation device, DADI, in transmission or from bus BMIC in reception. Accordingly, it implements the electrical matching of signals between DADI and BMIC. This interface is implemented, for example, with 74F244 components from the manufacturer R.T.C. for signals in the reception direction and with 7406 components for signals in the transmission direction.

The major principles of the functioning of the peripheral device, UPRI, functioning are as follows. It is assumed that it is functioning in the reception of signals. One skilled in the art will appreciate that the same steps occur during transmission of signals, except that the operations take place in the reverse order.

The data coming from the various terminals of the network, RLE, via link LS$_2$ and adapter CAS$_2$ and bus BMIC are transmitted, then, over 128 time channels ($4 \times 32$ time channels, since there are four buses, BMIC$_1$ to BMIC$_4$; see hereinabove in relation to the description of FIG. 4). These signals, serial-transmitted, are reshaped by interface INTI$_1$ and transmitted to the dynamic allocation device, DADI. Allocation device DADI, controlled by the processor, PCI, via interface INTI$_2$ and link LI, allocates one of the 128 time channels—for example, the 75th time channel, which is designated as VT$_{75}$—to one of physical channels V$_0$ to V$_{31}$ of the dual-access memory, DAMI (for example, channel V$_1$, where 1 lies between 0 and 31). This means that within one time frame, TRL, (see FIG. 2) the byte of data carried by time channel VT$_i$ is going to be allocated to physical channel V$_1$ of the dual-access memory, DAMI (actually to subchannel VR$_1$) and that the byte coming from device DADI is going to be stored temporarily in this channel. The corresponding byte serial-transmitted by interface INTI$_1$ to device DADI is going to be transformed into a byte which is parallel transmitted to the dual-access memory, DAMI. This byte, stored in channel V$_1$, is then read by the processor, PCSI, which is going to process it according to the protocol of the frame, MTR$_i$, to which the byte belongs, because of the protocol processing routine contained in memory MMI$_2$, in the HDLC protocol, for example, the processor, PCSI, deletes the flags, disinserts the zeros, reads the cyclic code, CRC, and deduces from it whether or not the frame contains an error. Once the byte has been processed, the processor, PCSI, transmits the byte directly via interface INTI$_2$ to the random-access memory, MVI$_1$, of the basic controller by a procedure of the well known DMA (direct memory access) type, such a procedure (and the corresponding interface, INTDMA; see below) being described, for example, in MOTOROLA SEMI-CONDUCTORS' manual pertaining to the 68020 processor. Before transmitting the byte to random access memory MVI$_1$, the processor, PCSI, can also store the byte in random access memory $MVI_2$ (if the traffic load is high, for example) before transmitting it to $MVI_1$, but this case is less frequent in practice After having been stored in $MVI_1$, the data relating to the same frame are transmitted (once or several times) to the central processing unit and the various terminals of the computer, COMP, via bus SMB.

As soon as another byte of a data frame, $MTR_j$, is transmitted over time channel $VT_j$, the dynamic allocation device, DADI, allocates physical channel k to this time channel, $VT_j$. A process analogous to that described hereinabove takes place then before frame $MTR_j$ is transferred, after its protocol has been processed, from memory $MVI_1$ of the basic controller, UEI, to the central processing unit and the terminals of the computer, COMP.

The allocation by device DADI, under the control of the processor, PCI, of any physical channel, $V_l$, $V_k$, . . . , to a time channel, $VT_i$, $VT_j$, is not performed, in practice, at the arrival of each byte, $IT_i$, of a frame, $MTR_i$, not even when the last byte of a frame, TRi, arrives at device DADI. In practice, the reallocation of a new physical channel different from $V_l$ (or ) to time channel $VT_i$ (or $VT_j$) takes place only when hundreds or even thousands of frames, $MTR_i$, have traveled over the same time channel, $VT_i$. The reallocation of channels, and, consequently, the corresponding reprogramming of the device, take place only when it is necessary to change the communication mode.

In other words, the dynamic allocation device, DADI, executes, under the control of the basic controller, UEI, the concentration of 128 time channels of four type $S_2$ links (see FIG. 4) in 32 parallel physical channels, $V_0$ to $V_{31}$, of the dual-access memory, DAMI. Device DADI implements the dynamic allocation of the various time division communication channels t parallel physical channels of the dual-access memory, DAMI. Given that the memory, DAMI, is of the FIFO type, it thereby can also be stated that there is a concentration of 128 time channels of the four type $S_2$ links in the 32 parallel time channels of the dual-access memory, DAMI. It is obvious that this dynamic allocation of serial time channels to the 32 parallel time channels is performed as a function of the requirements, that is, of the processing requirements and communication loads between the various terminals of the network in which the RLE is included, these processing requirements and communication loads being known to the basic controller, UEI.

A more detailed description of the functioning of the peripheral device, UPRI, will be given hereinunder in relation to FIGS. 8 and 9.

Figure 8:
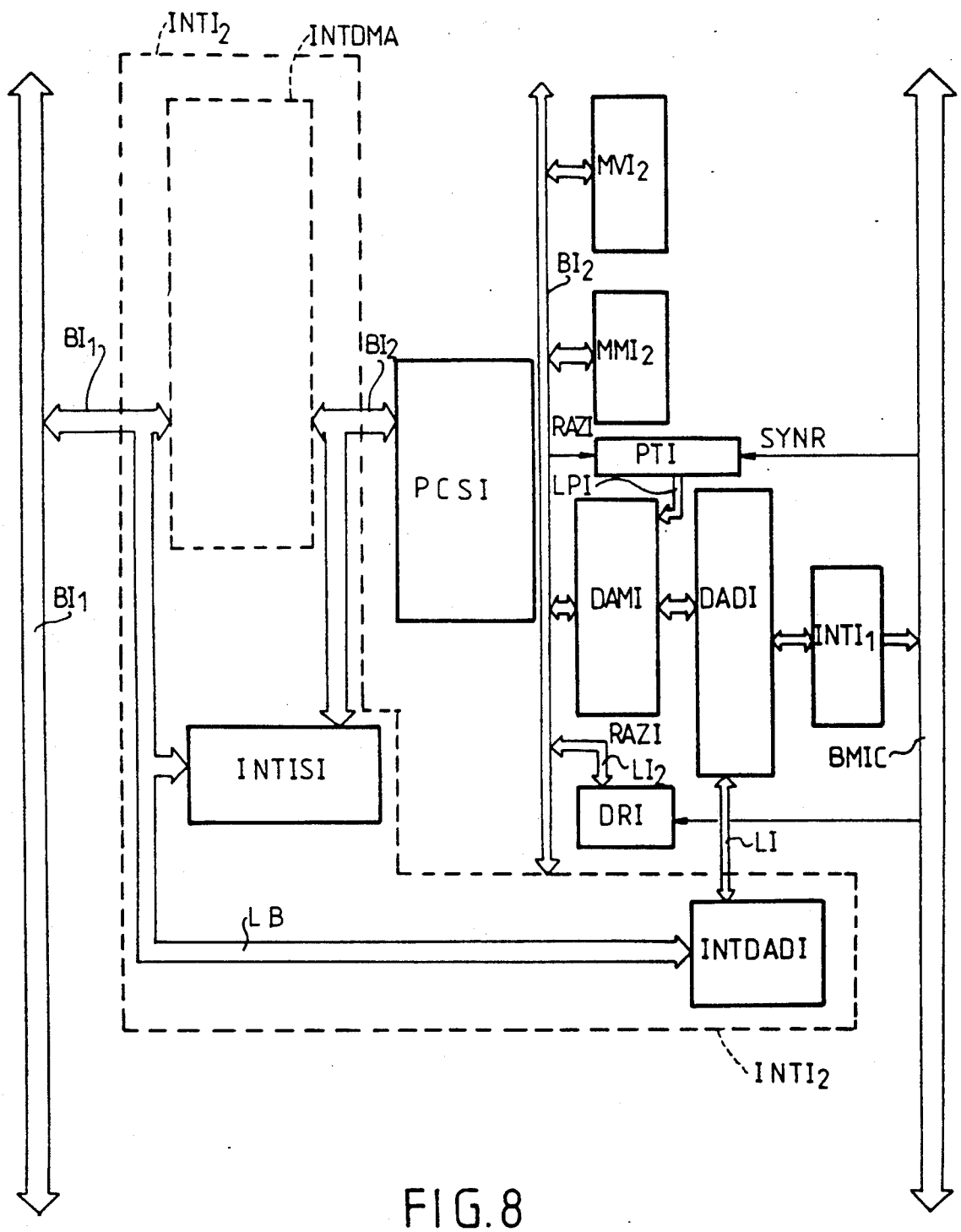
FIG. 8 is a more detailed view of FIG. 7.
Figure 9:
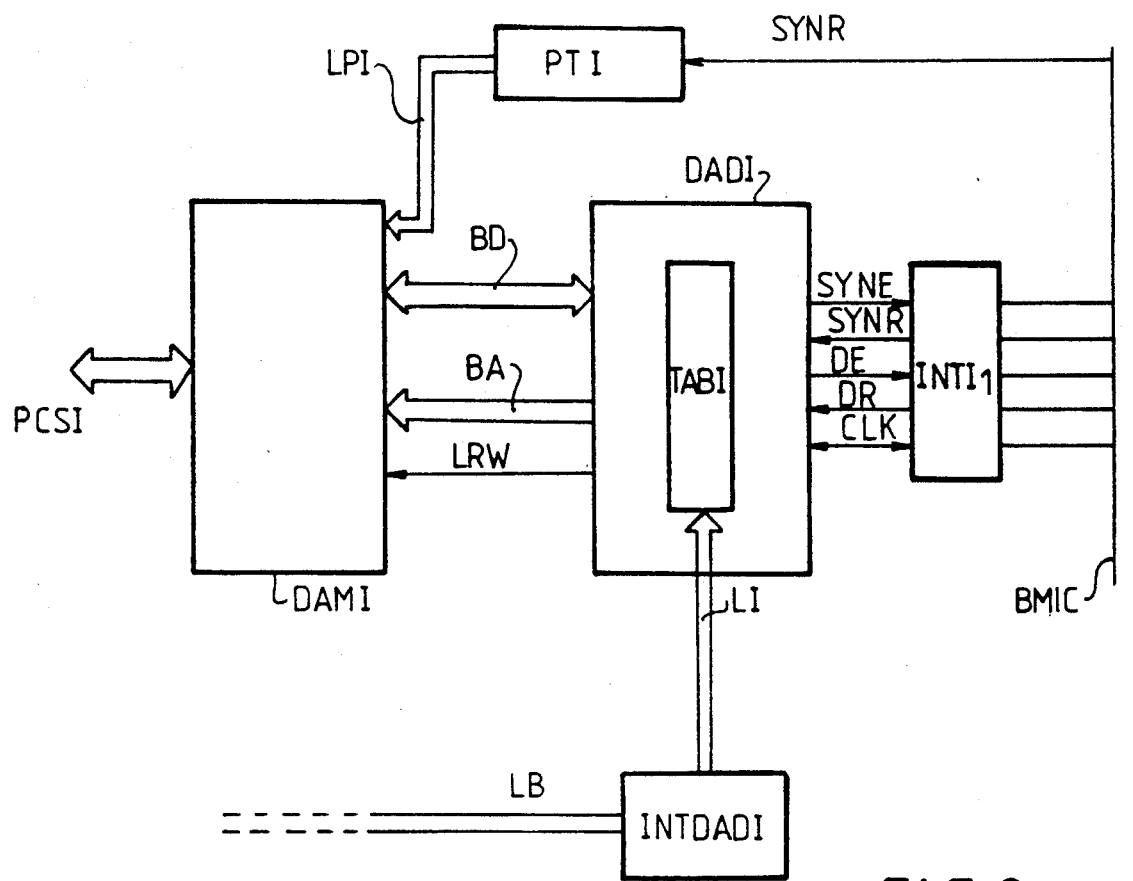
FIG. 9 is a detailed view of the essential constituent elements of the peripheral device of the communications controller according to the invention.

Reference is made to FIG. 8. Interface $INTI_2$ comprises a DMA interface, namely INTDMA; an interrupt and synchronization interface between processor PCI and processor PCSI, namely INTISI; and, finally, an interface between processor PCI and the allocation device, DADI, namely interface INTDADI.

Interface INTDMA communicates with the signal processor, PCSI, via bus $BI_2$ and is connected to bus $BI_1$ of processor PCI.

Interface INTISI is connected to bus $BI_1$ of the basic controller, UEI, on the one hand, and to bus $BI_2$ of the signal processor, PCSI, on the other. The purpose of this interface is to make possible all communication between the two processors—processor PCI must be able to let a connection or disconnection instruction reach the signal processor, PCSI, at any instant—and synchronization between these two processors. This interface, INTISI, is used primarily at the time when the two processors are reset. Interface INTDADI is connected via line LB to bus $BI_1$ and via line LI to dynamic allocation device DADI.

Line LB simultaneously transmits the addresses of the registers of the internal table, TABI, of device DADI (see hereinunder) corresponding to the n physical channels of memory DAMI, and the data that it must enter into these registers, that is, the designations of the time channels, $VT_i$, $VT_j$, that it must enter into them. On the other hand, line LI serially transmits the addresses of the registers after the data that are to be entered into them.

This interface, INTDADI, then, transmits the instructions for the allocation of each of the 128 time channels to each of the 32 parallel time channels of the dual-access memory, DAMI (see description hereinabove).

Reference is made now to FIGS. 8 and 9 to 11, which show in a more detailed manner how the peripheral device, UPRI, is constituted and how it functions.

Figure 11:
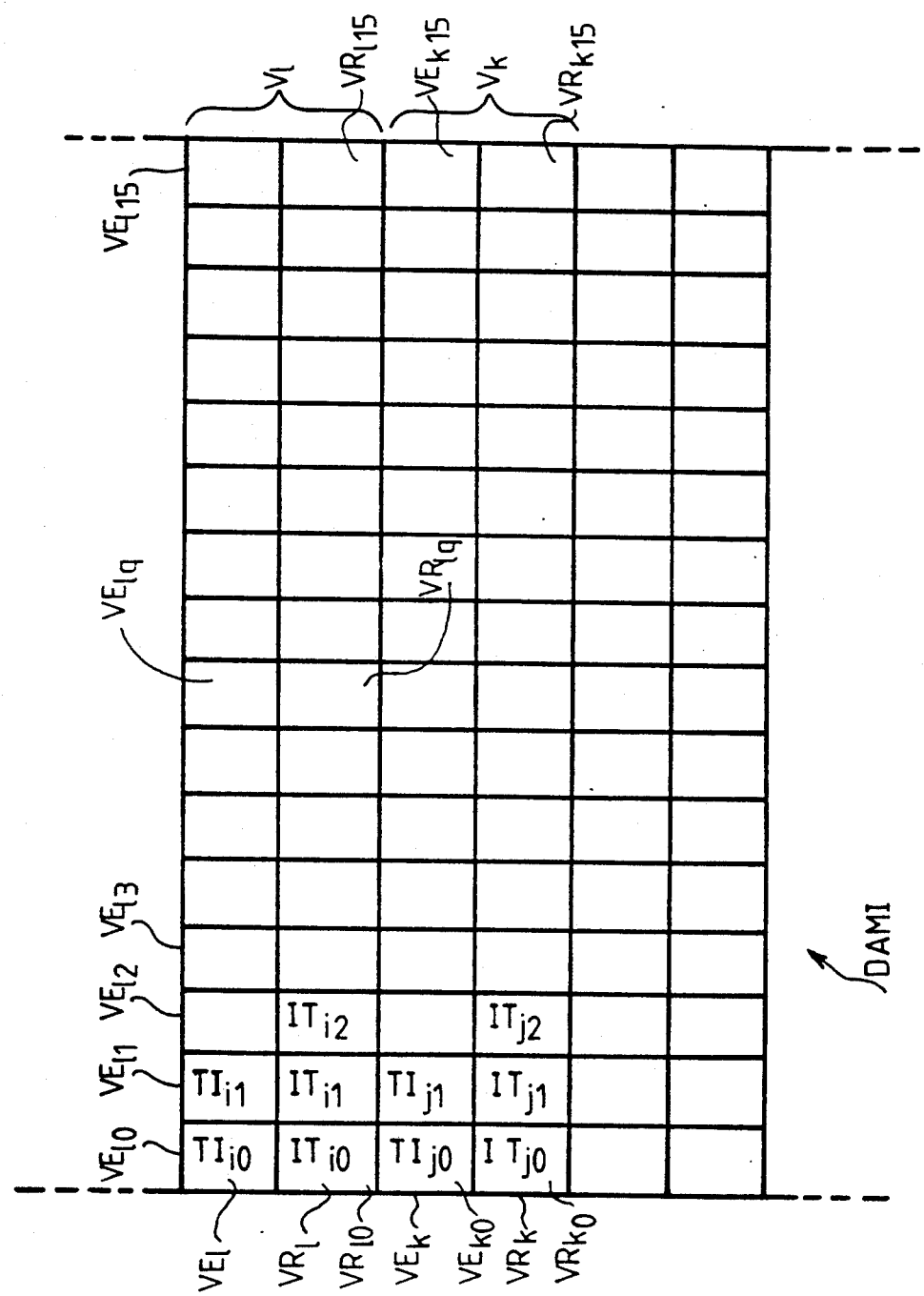
FIG. 11 illustrates the detailed functioning of the peripheral device.

This device comprises, in addition to the components already cited previously, pointer PTI and data transfer control device DRI. Pointer PTI receives the timing signals, SYNR, coming from bus BMIC, and, an initial reset-to zero signal, RAZI, sent via bus $BI_2$ by the signal processor, PCSI, when the work of the controller, CCI, begins. As can be seen in FIG. 9, pointer PTI, which is actually a modulo-16 counter whose contents are incremented by one unit when it receives a timing pulse (SYNR) corresponding to the arrival of a time frame, TRL (see FIG. 2), is also linked via a 4-bit parallel link, LPI, to the dual-access memory, DAMI. It is known that each channel, $V_1$, (comprising subchannel $VE_1$ and subchannel $VR_1$) can contain 16 bytes corresponding to 16 serial time frames. Actually, in practice, (for hundreds or even thousands of serial time frames, TRL), the 16 bytes contained in the same channel, $V_1$, are bytes, $IT_i$, belonging to 16 serial time frames. Each channel, $V_l$, (comprising subchannel $VE_1$ and subchannel $VR_1$) accordingly comprises 16 sections, each containing one byte, $IT_i$, belonging to one of the 16 serial time frames, these 16 sections having a rank of between zero and 15 and being designated as $VE_{lq}$ and $VR_{lq}$ (FIG. 11).

Pointer PTI, which indicates the rank, q, of a time frame, $TRL_q$, among 16 serial frames (between 0 and 15), then, indicates the rank of the section, $VE_{lq}$ (or $VR_{lq}$), where byte $IT_i$ of said frame, $TRL_q$, is ranked temporarily in channel $V_1$.

Control device DRI is actually made up of a 4-bit countdown counter device that makes it possible to determine the filling status of the dual-access memory. This counter receives the timing signal, SYNR, cominq from bus BMIC. This counter is incremented by one unit each time it receives a timing pulse (and consequently, each time a frame of the TRL type arrives in device DADI), and is decremented by two units each time the signal processor has completed processing relating to two serial TRL frames. As a matter of fact, the signal processor processes 16 bits, or two serial bytes. The signal processor is able to read the contents of the DRI counters over their four least significant bits of data. At the start of operations, the signal processor, PCSI, resets DRI (and also PTI; see above), then, as soon as it declares itself ready to work, enables the functioning of counter DRI by sending a write signal to a dedicated input of the counter (which, for the sake of simplicity, is not shown in FIG. 8) via link $LI_2$.

Processor PCSI, which also counts (using a pointer of the internal software type, TRL, which arrive in it, executes a comparison between the contents of its internal counter and the contents of control device DRI.

Moreover, processor PCSI is able to generate three types of interrupts of controller CCI in accordance with certain specific values of the contents of control device DRI, which are, in the example of embodiment described here, 15, 12 and 5 (or 4).

If the contents of the control device DRI equal 15, then processor PCSI generates an interrupt to processor PCI via interface $INTI_2$ (INTISI). Then everything is reset and the set of operations that were in progress and were not able to be processed by processor PCSI will have to be restarted (both in transmission and reception).

If processor PCSI does not read the bytes contained in memory DAMI sufficiently quickly, the contents of device DRI are going to become equal to 12. (Memory DAMI becomes three quarters full.) This device sends a first interrupt signal (via $LI_2$) to PCSI. Thus, in order to reabsorb its lag, (it does not read and/or write in memory DAMI as quickly as the bytes arrive at the dynamic allocation device, processor PCSI decides, for example, to process signals only in reception. As a general rule, its lag is reabsorbed and the contents of DRI are going to go down again to 4 or 5 (memory DAMI becomes three quarters empty) It generates a second interrupt via $LI_2$ to PCSI, which then resumes its normal work in transmission and reception. In general, when the traffic peak has passed, the contents of counter DRI never exceed 12 and stay between 1 and 3 (normal traffic).

It is obvious that if, after the first interrupt (contents equal to 12) the contents of the counter continue to grow so as to reach 15, one is brought back to the case described hereinabove, namely an interrupt of processor PCI and complete reset to zero. It should be noted that an interrupt that occurs when memory DAMI is three quarters empty (contents equal to 4) can occur only when the interrupt corresponding to a memory three quarters full has occurred, and vice versa.

The dynamic allocation device, DADI, receives (or sends), cominq from interface $INTI_1$ connected to bus BMIC, data signals, DR (DE signals); the timing signal, SYNR (SYNE); and the clock signal, CLK. Dynamic allocation device DADI contains a table, TABI, that establishes the correspondence between the time channel, $VT_i$, of the 128 time channels that are transmitted by bus BMIC and the physical channel, $V_1$, of the dual-access memory, DAMI. This correspondence is established under the control of processor PCI of basic controller UEI via interface $INTI_2$.

At the output, the dynamic allocation device, DADI, is connected via an 8-bit parallel data bus, BD, a 5-bit address bus, BA, and a single wire link, LRW, to the dual-access memory, DAMI. The address bus, BD, transmits the byte of data corresponding to the time channel, $VT_i$; the address bus, BA, transmits in five bits the address of the physical channel, $V_1$, of the dual-access memory, DAMI; whereas the link, LRW, indicates whether it is transmission of data or reception of data (DR or DE). Device DADI proceeds to write bytes in DAMI in reception (in subchannel $VR_1$) and proceeds to read them in transmission (in subchannel $VE_1$).

The detailed operation of the system is as follows:

It is assumed that the PCSI has reset (via signal RAZI) pointer PTI and control device DRI and that it has then enabled their operation. Reference is made then to a series of 16 time frames (the operation is identical for all time frames that follow these first 16), namely $TRL_0, TRL_1, TRL_2, \ldots, TRL_q, \ldots, TRL_{16}$. Reference is made, moreover, to a first byte of data, $IT_i$, corresponding to time channel $VT_i$ belonging to data frame $MTR_i$ and a second byte, $IT_j$, corresponding to $VT_j$ and belonging to $MTR_j$ (Reference could be made also to other bytes corresponding to other time channels, but the operation would be the same as for $IT_i$ and $IT_j$.) The bytes, $IT_i$ and $IT_j$, corresponding to time frames $TRL_0$ to $TRL_{15}$ are $IT_{i0}$ to $IT_{i15}$ and $IT_{j0}$ to $IT_{j15}$.

Let the first frame be $TRL_0$ and the corresponding bytes be $IT_{i0}$ and $IT_{j0}$.

The timing signal, SYNR, arrives in PTI, DADI and DRI.

The contents of pointer PTI change from zero to one. The contents of control device DRI change from zero to one. Byte $IT_{i0}$ is then series transmitted (after having been reshaped by interface $INTI_1$) to device DADI. Table TABI then contains the number, 1, of physical channel $V_1$, whose subchannel $VR_1$ is going to contain byte $IT_{i0}$ which will go into section $VR_{10}$. This table establishes the correspondence between i and 1. The address bus, BA, of the output of DADI then contains the value 1 when it receives byte $IT_{i0}$ (for example, this byte, $IT_{i0}$, can be the 75th byte among the 128 which bus BMIC transports and has to go over channel $1 = 17$). Byte $IT_{i0}$ is stored inside registers (for the sake of simplicity, not illustrated in FIGS. 8 and 9) of the serial-parallel type of DADI for the time necessary for the transformation from a serial byte into a parallel byte. Byte $IT_{i0}$ is then written by DADI into section $VR_{10}$, line LPI of pointer PTI then transmitting in 4 bits the value 0, which is the number of section $VR_{10}$, which contains byte $IT_{i0}$ (and which corresponds to the number 0 of frame $TRL_0$). An analogous argument can be made for byte $IT_{j0}$, transformed by DADI from a serial byte into a parallel byte and written by it into section $VR_{k0}$ of subchannel $VR_k$ of channel $V_k$, which is the physical channel allocated to time channel $VT_j$ by processor PCI and accordingly by device DADI.

Once $IT_{i0}$ and $IT_{j0}$ have been written, and before the new timing pulse corresponding to frame $TRL_1$ arrives, DADI proceeds to read what is contained in sections $VE_{10}$ and $VE_{k0}$ of subchannels $VE_l$ and $VE_k$ of channels $V_l$ and $V_k$ where processor PCSI is supposed to have written bytes belonging to the transmission frames sent by basic controller UEI. Actually, immediately after the reset, the processor writes nothing into DAMI as long as the contents of DRI are not equal to 3. Because of this, DADI is going to read sections $VE_{l0}$ and $VE_{k0}$ whose contents are null.

When $TRL_l$ arrives, then the contents of PTI and DRI change to 2. DADI writes bytes $IT_{il}$ and $IT_{jl}$ into sections $VR_{ll}$ and $VR_{kl}$, DADI reading what is supposed to be written into sections $VE_{ll}$ and $VE_{kl}$, and accordingly reads null contents.

When $TRL_2$ arrives, then the contents of PTI and DRI change to three.

During the same time, DADI writes bytes $IT_{l2}$ and $IT_{j2}$ into $VR_{l2}$ and $VR_{k2}$ and reads what is supposed to be written in sections $VE_{l2}$ and $VE_{k2}$ and accordingly reads null contents. During this time, PCSI reads DRI, sees that its contents equal three, accordingly knows that two bytes—$IT_{i0}$, $IT_{ii}$, $IT_{j0}$, $IT_{jl}$, etc.—have arrived and proceeds to read them, actually processing according to the communication protocol used by $MTR_i$ and $MTR_j$, and then stores them before transmission to $MVI_l$ via interface INTDMA. PCSI then writes two bytes of data, $TI_{i0}$ and $TI_{j0}$, belonging to two data frames transmitted by basic controller UEI—for example, time frames $TMR_i$ and $TMR_j$—into sections $VE_{10}$ and $VE_{k0}$ of DAMI and the two bytes following $TI_{il}$ and $TI_{jl}$ belonging to the same frames into sections $VE_{l1}$ and $VE_{kl}$.

Once this has been completed, PCSI decrements by two the contents of DRI (which change to 1) and saves in memory (by its internal pointer) the fact that it read what was contained in $VR_{10}$–$VR_{11}$ and $VR_{k0}$–$VR_{k1}$.

Then frame $TRL_3$ arrives. The contents of PTI change to 4. The contents of DRI change to 2. DADI writes $IT_{i3}$ and $IT_{j3}$ into $VR_{13}$ and $VR_{k3}$ and reads the null contents of $VE_{l3}$ and $VE_{k3}$. PCSI does nothing. When $TRL_4$ arrives, PTI changes to 5 and DRI changes to 3. Analogous processing as previously described with respect to the arrival of $TRL_2$ then takes place. DADI writes $IT_{i4}$ and $IT_{j4}$ into $VR_{i4}$ and $VR_{k4}$. PCSI proceeds to read the bytes contained in $VR_{i2}$–$VR_{i3}$ and $VR_{k2}$–$VR_{k3}$. The phenomena then repeat, identical to one another, until the arrival of $TRL_{16}$ or PTI changes to zero and DRI to 2 or 3 (depending on whether PCSI has had a normal cycle or has been delayed).

$IT_{il6}$–$IT_{jl6}$ will be written into $VR_{i0}$–$VR_{k0k}$ and so forth, and the process repeats, self-identically.

What is claimed is:

1. ISDN multiprotocol communications controller ensuring the control of at least one communication link supported physically by a transmission line connected to data circuit terminating equipment and comprising a specific number of data channels controlled according to a multiplicity of protocols, between at least one computer and a set of terminals through at telephone automatic branch exchange, comprising:

a basic controller receiving data coming from either the computer or the terminals via a type $S_2$ link, for controlling upper communication layers, a peripheral device disposed between the basic controller and data circuit terminating equipment, the peripheral device executing the control of communications between the computer and the set of terminals as well as executing time-division multiplexing and demultiplexing of the data channels of the link, wherein the peripheral device comprises:

a dynamic allocation device connected to the data circuit terminating equipment, for allocating time-division data channels corresponding to the data channels of the communication link, a random-access dual-access memory of the FIFO type connected to the dynamic allocation device, comprising n discrete physical channels both for transmission and reception, a signal processor connected to the random-access dual-access memory and having a programmable memory containing programs for processing the multiplicity of protocols contained in the $S_2$ link, the dynamic allocation device receiving or transmitting the data and a timing signal sent either by the terminating equipment or by the signal processor, over a serial data bus carrying m time channels with m equal to or greater than n, transforming in reception sets of serial bits into a set of parallel bits sent to the dual-access memory and transforming in transmission a set of parallel bits received from the dual-access memory into sets of serial bits, ensuring the concentration of the m time channels in the n physical channels of the dual-access memory by the dynamic allocation of the m time channels to the n physical channels, under the control of the basic controller, the signal processor proceeding to read in each channel of the dual-access memory, upon the arrival of each bit of the timing signal, the data that have been written by the allocation device, and write, in each channel of the dual-access memory, upon the arrival of each bit of the timing signal, the data that have been read by the allocation device, stores them in memory, analyzes the status of the frames according to the type of protocol used for the transmission of these frames and extracts from them the data, which it then transmits to the basic controller.

2. Controller according to claim 1, wherein the dynamic allocation device includes a table where a correspondence between each time channel and each physical channel of the dual-access memory is written, the allocation device transferring through the dual-access memory, on the one hand, a set of parallel bits, and on the other, the number of the physical channel where the set has to be transferred through, and, finally, a bit indicating a direction of the transfer.

3. Controller according to one of claims 1 and 2, wherein each physical channel of the dual-access memory can contain 9 sets of parallel bits.

4. Controller according to claim 3, wherein it includes a pointer reset to zero by a signal (RAZI) sent by the processor, and receiving the aforesaid timing signal (SYNR), counting the number of time frames transferred and sending to the dual-access memory the rank, q, of the set of parallel bits that has been transferred by the dynamic allocation device in the physical channel.

5. Controller according to claim 4, wherein the pointer (PTI) comprises a modulor 16 counter.

6. Controller according to claims 1 or 2, wherein it includes a data transfer control device receiving the timing signal (SYNR0), for incrementing and holding a count of the number of time frames received by the allocation device, and an equivalent number of bits written by the signal processor in the dual-access memory, decremented by the signal processor by a given number of units each time an equivalent number of a set of bits is read by the signal processor in the dual-access memory and each time a time frame is transmitted by the allocation device, and generating a temporary interrupt of all or part of the signal processor's operations when the count exceeds a first given value and when the count becomes less than a second given value after having been greater than the first.

7. Controller according to claim 6, wherein the control device comprises a modulo-16 counter.

8. An ISDN multiprotocol communications controller for controlling at least one communication link supported physically by a transmission line and comprising a specific number of data channels controlled according to a multiplicity of protocols, between at least one computer and a set of terminals through an automatic telephone branch exchange, comprising:

a basic controller for receiving the data coming from the terminals via the type $S_2$ link, and controlling the higher communication layers of an OSI model, a peripheral device disposed in series between the basic controller and data circuit terminating equipment, said data circuit terminating equipment being connected to the transmission line, the peripheral device controlling communications between the computer and the other terminals and time-division multiplexing and demultiplexing of the data channels of the link, said peripheral device including:

a dynamic allocation device for allocating time division data channels corresponding to the data channels of the communication link, a random-access dual-access memory of the FIFO type comprising n discrete physical channels for reception, a signal processor connected to a programmable memory containing programs for processing the multiplicity of protocols contained in the $S_2$ link, wherein the dynamic allocation device receives data and a timing signal (SYNR) sent by the terminating equipment over a serial data bus carrying m time channels with m equal to or greater than n, transforms the sets of serial bits into a set of parallel bits sent to the dual-access memory, concentrates the m time channels in the n physical channels of the dual-access memory by the dynamic allocation of the m time channels to the n physical channels under the control of the basic controller, and the signal processor reads, in each channel of the dual-access memory, upon the arrival of each bit of the timing signal (SYNR), the data that have been written by the allocation device, stores the data in memory, analyzes the status of the frames according to the type of protocol used for the transmission of said frames and extracts from said frames the data, and transmits said data to the basic controller.

9. A controller according to claim 8, wherein the dynamic allocation device includes a table where correspondences between each time channel and each physical channel of the dual-access memory are stored, the allocation device sending to said memory, each set of parallel bits and the number of the physical channel where said set of parallel bits is to be stored, and a bit indicating whether said set is to be written in said physical channel.

10. A controller according to one of claims 8 or 9 wherein, each physical channel of the dual-access memory contains q sets of parallel bits.

11. A controller according to claim 10, further comprising a pointer reset by a signal sent by the processor, said pointer receives the timing signal (SYNR), counts the number of time frames received, and sends to the dual-access memory a rank, q, of the set of parallel bits that has been written in the physical channel by the dynamic allocation device.

12. A controller according to claim 11, wherein the pointer comprises a modulo-16 counter.

13. A controller according to claims 8 or 9, further comprising a data transfer control device for receiving the timinq signal (SYNR), counting the number of time frames received by the allocation device, decremented by the signal processor by a given number of units each time an equivalent number of a set of bits is read by the signal processor in the dual-access memory, said data transfer control device generating a temporary interrupt of all or part of the signal processor's operations when its contents exceed a first given value or become less than a second given value after having been greater than the first, or vice versa.

14. A controller according to claim 13, wherein the control device comprises a modulo-16 counter.

15. An ISDN multiprotocol communications controller for controlling at least one communication link supported physically by a transmission line and comprising a specific number of data channels controlled according to a multiplicity of protocols, between at least one computer and a set of terminals through an automatic telephone branch exchange, comprising:

a basic controller for receiving the data cominq from the computer and controlling the higher communication layers of an OSI model, a peripheral device disposed in series between the basic controller and data circuit terminating equipment, said data circuit terminating equipment being connected to the transmission line, the peripheral device controlling communications between the computer and the other terminals and time-division multiplexing and demultiplexing of the data channels of the link, said peripheral device including:

a dynamic allocation device for allocating time division data channels corresponding to the various data channels of the communication link, a random-access dual-access memory of the FIFO type comprising n discrete physical channels for transmission, a signal processor connected to a programmable memory containing programs for processing the multiplicity of protocols contained in the $S_2$ link, wherein the dynamic allocation device transmits data and a timing signal (SYNE) sent by the signal processor, over a serial data bus carrying m time channels with m equal to or greater than n, transforms the data from a set of parallel bits read from the dual-access memory to a set of serial bits, concentrates the m time channels into the n physical channels under the control of the basic controller, and the signal processor writes, in each channel of the dual-access memory, upon the arrival of each bit of the timinq signal (SYNE), the data that have been read by the allocation device, reads the data from memory, analyzes the status of said frames according to the type of protocol used for the transmission of said frames and transmits said frames to the data circuit terminating equipment.

16. A controller according to claim 15, wherein the dynamic allocation device includes a table where correspondences between each time channel and each physical channel of the dual-access memory are stored, the allocation device receiving from said memory each set of parallel bits and the number of the physical channel where said set is to be read from, and a bit indicating whether said set is to be read from said physical channel.

17. A controller according to one of claims 15 or 16, wherein each physical channel of the dual-access memory contains q sets of parallel bits.

18. A controller according to claim 17, further comprising a pointer reset by a signal sent by the processor, said pointer receives the timinq signal (SYNE), counts the number of time frames transmitted, and sends to the dual-access memory a rank, q, of the set of parallel bits that has been read in the physical channel by the dynamic allocation device.

19. A controller according to claim 18, wherein the pointer comprises a modulo-16 counter.

20. A controller according to of claims 15 or 16, further comprising a data transfer control device for receiving the timing signal (SYNR), counting the number of time frames transmitted by the allocation device, decremented by the signal processor by a given number of units each time an equivalent number of a set of bits is written by the signal processor in the dual-access memory, said data transfer control device generating a temporary interrupt of all or part of the signal processor's operations when its contents exceed a first given value or become less than a second given value after having been greater than the first, or vice versa.

21. A controller according to claim 20, wherein the control device comprises a modulo-16 counter.

22. An ISDN multiprotocol communications controller for controlling at least one communications link supported physically by a transmission line terminated at data circuit terminating equipment and having a specific number of data channels controlled according to a multiplicity of protocols, between at least one computer and a set of terminals through an automatic telephone branch exchange, comprising:
   a basic controller for receiving data coming from the computer and the terminals via an $S_2$ link and controlling upper layers of an OSI communications model; and
   a peripheral device disposed in series between the basic controller and the data circuit terminating equipment, for controlling communications between the computer and the terminals, including:
   p1 a signal processor connected to the basic controller and having a programmable memory containing programs for processing the multiplicity of protocols used in the $S_2$ link; and
   means connected to the data circuit terminating equipment, for dynamically allocating time-division data channels corresponding to the data channels of the communication link.

23. An ISDN multiprotocol communications controller as claimed in claim 22, wherein the peripheral device further comprises:
   a random-access dual-access memory of the FIFO type connected to the signal processor and connected to the means for dynamically allocating, having n discrete physical channels for reception.

24. An ISDN multiprotocol communications controller as claimed in claim 23, wherein the means for dynamically allocating further comprises:
   means for holding a table of correspondence between each time channel and each physical channel of the random-access dual-access memory.

25. An ISDN multiprotocol communications controller as claimed in one of claims 23 or 24, wherein the n discrete physical channels of the random-access dual-access memory further comprise:
   q sets of parallel bits.

26. An ISDN multiprotocol communications controller as claimed in claim 25, wherein the signal processor further comprises:
   means for sending a timing signal to the means for dynamically allocating, the timing signal representative of a number of sets of parallel bits transmitted; and
   means for receiving the timing signal and counting the number of sets of parallel bits transmitted, the count pointing to one of the q sets of parallel bits.

27. An ISDN multiprotocol communications controller as claimed in claim 26, wherein the means for receiving and counting further comprises:
   a modulo-16 counter.

28. An ISDN multiprotocol communications controller as claimed in claim 26 further comprising:
   a data transfer control device including:
      means for receiving the timing signal and incrementing a transfer count for each set of parallel bits transferred into the dual-access memory, and
      means for decrementing the transfer count by a given number of units each time an equivalent number of sets of bits is transferred out of the dual-access memory,
   said transfer control device signaling a temporary interrupt to the signal processor when the transfer count exceeds a first value and when the transfer count becomes less than a second value after having been greater than the first value.

29. An ISDN multiprotocol communications controller as claimed in claim 28, wherein the data transfer control device further comprises:
   a modulo-16 counter for holding the transfer count.

* * * * *